Patented Feb. 27, 1951

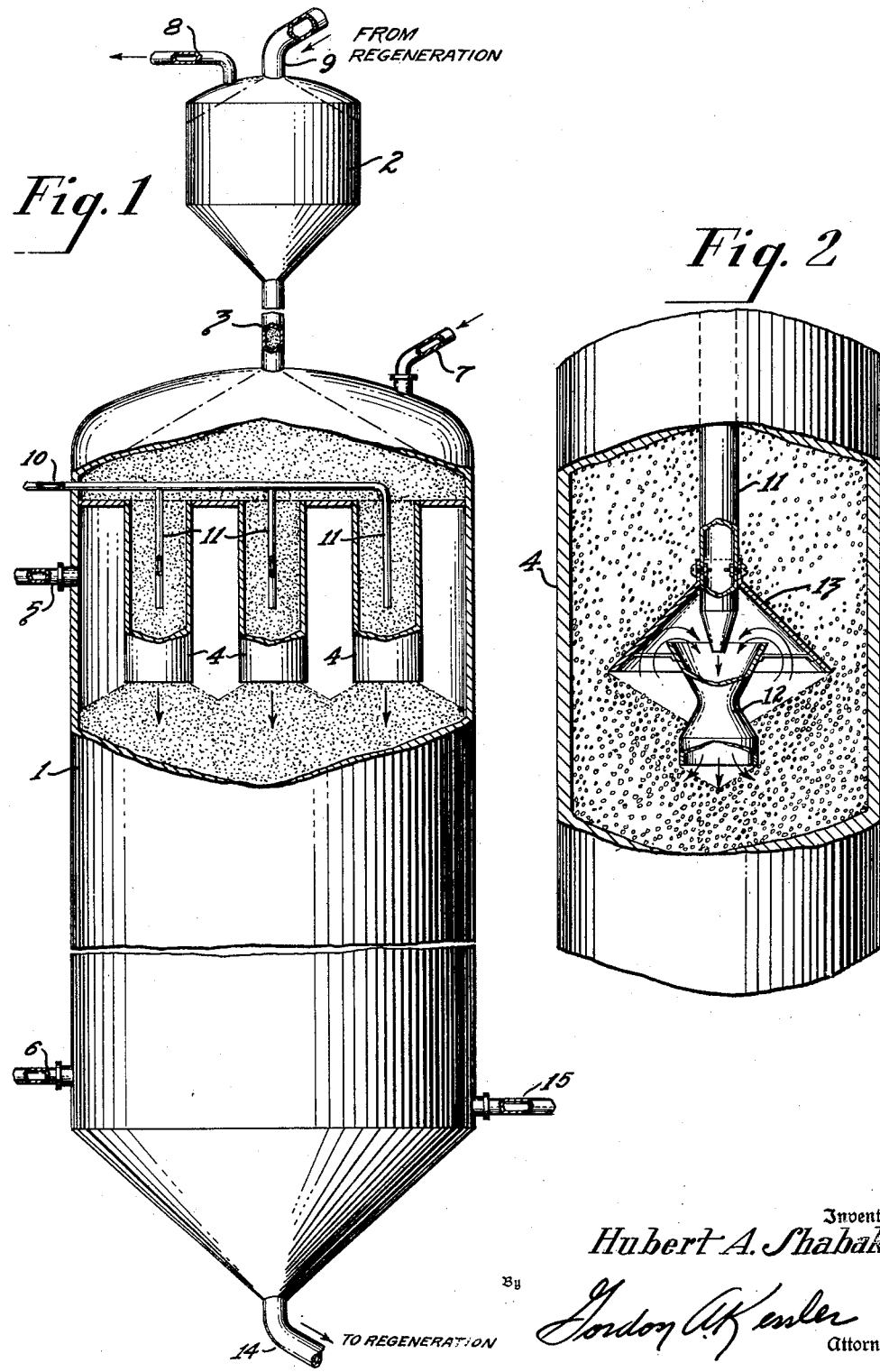

2,543,070

UNITED STATES PATENT OFFICE 2,543,070

HYDROCARBON CONVERSION APPARATUS AND PROCESS

Hubert A. Shabaker, Media, Pa., assignor to Houdry Process Corporation, Wilmington, Del., a corporation of Delaware Application October 4, 1947, Serial No. 777,996

6 Claims. (Cl. 196—52)

The present invention relates to hydrocarbon conversion operations conducted in systems employing moving catalysts and particularly to such operations in which a petroleum charge stock having a comparatively rapid deteriorating effect on the catalyst employed, such as a sulfur-containing stock, is contacted at elevated temperature with the catalyst.

In catalytic cracking of corrosive petroleum charge stocks such as stocks of high sulfur content (those containing above about 1% sulfur in free and combined form) or others having smaller sulfur content in highly reactive form, it has been observed, particularly when present commercial clay cracking catalysts are employed such as acid activated sub-bentonite clays, that the catalyst is impaired in activity at an abnormal rate. Catalyst so affected is said to be "poisoned" or "abnormally aged." If the operation is continued with the addition of only the usual amount of "make up" catalyst that is employed with "sweet" or noncorrosive stocks, the efficiency of the operation from the standpoint of production of gasoline and other desired normally liquid conversion products suffers considerably, and in order to maintain the operation at an economic conversion level, large amounts of fresh catalysts must be added to the system to replace deteriorated catalyst. The same is true in catalytic treating of gasoline and naphthas containing such sulfur compounds by contact at elevated temperature with cracking catalysts.

It has now been found that the "abnormal aging" of sulfur-sensitive catalysts such as commercial active clay catalysts by such sulfur-containing charge stocks at the high temperatures of these conversion operations, can be prevented or largely reduced by prehydration of the catalyst with steam shortly before the catalyst comes into contact with the oil to be cracked or treated. The amount of steam introduced to obtain the full advantages of this protective effect should be that sufficient to substantially saturate the hot regenerated (and added catalyst) entering the system, at the conventional temperatures employed. For active clay catalysts of the type generally in commercial use, at the conventional operating temperature employed of about 700 to 1100° F., this requires an amount of steam of about 1½ to 2½% by weight of catalyst.

In treating calcined active clay catalysts with steam at temperatures in the order of 700° F. and above, the heat of adsorption gives rise to an increase in temperature in the order of about 50–100° F. In accordance with the present invention, by prehydrating an active clay catalyst with steam shortly before the catalyst is contacted with the hydrocarbon vapors to be cracked or treated, this increase in temperature of the catalyst can be beneficially utilized with minimum heat losses, to increase the severity of the hydrocarbon conversion reactions thereby obtaining improvement in quality and/or quantity of the desired reaction products. These advantages are moreover obtained without requiring costly outlay for expensive construction materials for catalyst conveying and handling equipment that would otherwise be necessary to withstand increased temperatures at these high operating levels. The present invention is therefore not limited to the use of steam in prehydration of the catalyst in cracking or treating corrosive stocks but also includes steam treatment as herein described of active clay catalyst used in processing of other petroleum stocks.

In cracking of heavy charge stocks such as those having a mid boiling point of above about 650° F., it has been the practice to add a small amount of steam, usually about 4 to 5% and in some instances up to 10% by weight of the charge, to assist in vaporizing the high boiling constituents of the charge. Although in some cases this amount of steam introduced may exert some protective action against sulfur compounds, in the case of certain charge stocks containing smaller or larger amounts of sulfur compounds, the protective action of steam so introduced cannot be relied upon, since as often or more often fairly rapid deactivation of the catalyst nevertheless takes place. The deteriorating action of sulfur-containing stocks on the usual clay catalysts is therefore not entirely a matter of the quantity of sulfur compounds contained therein but is also affected to a considerable degree by the kind of catalyst deactivating compounds contained. Addition of large quantities of steam to the charge, in the order of above 10–15% by weight of the charge, may enhance the protective action somewhat, but the handling of this amount of steam in many present commercial systems employing moving catalysts becomes exceedingly difficult or economically undesirable because of the conditions of pressure drop encountered in the reactor proper as well as in the auxiliary fractionating equipment and because of the increased load thereby imposed on the system particularly in the condensation of the effluent from the reactor.

Catalyst that has been abnormally aged or deactivated by sulfur compounds typically shows in addition to lower gasoline yields a lowering of the gravity of the fixed gases obtained in cracking of hydrocarbons and an increase in the production of coke; gasoline/coke ratios obtained are significantly reduced. Prolonged periods of contact of active catalysts with steam at elevated temperatures also tends to effect a decline in activity, which is not, however, accompanied by increase in coke and lowered gravity of the cracked gaseous products obtained.

In accordance with the present invention, sulfur sensitive catalyst, or any type active clay catalyst, is hydrated with steam before the catalyst is contacted with the oil vapors in the reactor. The steam is introduced at a point in the system such that the contact between the catalyst and the steam is not too prolonged but is yet of sufficient duration to effect substantial saturation of the clay. The invention will be fully understood from the detailed description read in connection with the accompanying drawing showing one form of apparatus which may be used in practical operation of a hydrocarbon conversion system embodying the invention.

In the drawing, Fig. 1 is a front elevation, partly diagrammatic, of a typical reactor, parts being broken away and shown in section to illustrate the novel means of introduction of steam for the purpose of the invention; Fig. 2 is an enlarged vertical section of a catalyst distributor conduit, of the type shown in Fig. 1, diagrammatically illustrating a modified device for steam introduction.

Referring now to Fig. 1 of the drawing, there is shown generally a reactor 1 into which catalyst is introduced at the top from a hopper 2 by means of a seal leg 3. Means are provided to obtain uniform distribution of the catalyst in the reactor comprising a plurality of catalyst distributor conduits or downcomers 4; only a small number of which are shown here for purposes of simplicity. Means are also provided for the introduction of the vaporized charge stock and for the withdrawal of converted products, comprising conduits 5 and 6. In a concurrent operation the oil vapors may be charged through conduit 5 and withdrawn through conduit 6, while in a counter-current operation the reverse will be true. The catalyst passes by gravity by means of the downcomers 4 into contact with the oil vapors which are converted into desired products and a quantity of carbonaceous or hydrocarbonaceous deposit, called "coke," is thereby formed on the catalyst. The catalyst continues its downward movement to a discharge outlet 14 and then is conveyed by suitable conventional means to a regenerator (not shown) where it is contacted with oxygen-containing gas to burn off the accumulated deposit; regenerated catalyst is then returned to the hopper 2. Previous to discharge from the reactor the catalyst is customarily treated with purge gas, which may be admitted below the conduit 6, as by a conduit 15.

To prevent the escape of hydrocarbon vapors above the reactor, means are provided for the introduction of an inert seal gas, which may comprise a pipe 7 generally situated above the catalyst level in the reactor. The seal gas, which may be flue gas, also provides a means for balancing the pressure drop in the reactor, a portion of the introduced seal gas passing downwardly with the catalyst through the downcomer 4 while the remainder of the gas passes upwardly into seal leg 3 counter to the gravitational flow of the catalyst. The upwardly flowing seal gas is discharged through an outlet 8 at the top of the hopper 2. Regenerated catalyst including added or "make up" catalyst is introduced into the hopper 2 by means of the charge conduit 9.

The portions of the apparatus thus far described are conventional and form no part of the present invention except as used in combination with the means for introducing steam presently to be described. Steam is introduced to effect hydration of the catalyst prior to its contact with hydrocarbon vapors by charging the steam into the downcomers 4. As shown, this is accomplished by the provision of a steam charge pipe 10 at the top of the reactor having connecting branch lines 11 entering each of the downcomers 4. The steam is thus directed downwardly and in the direction of the movement of the catalyst and is introduced at a lower pressure than that of the inert seal gas introduced through pipe 7 so that substantially all of the steam goes to contact catalyst at and below the point of steam discharge. The terminus of each branch line 11 is within a downcomer 4 and at such a distance from the discharge end of the downcomer to permit sufficient contact time between the steam and the catalyst during the travel of the catalyst from the point of steam discharge to the discharge end of the downcomer to saturate the catalyst with steam and preferably not substantially in excess of such distance. By thus introducing the required quantity of steam at a multiplicity of points across the cross section of the convertor, this quantity of steam uniformly hydrates the catalyst in a comparatively short time of contact therewith.

If desired, the uniformity of the steaming can be further enhanced by the provision of a multiplicity of steam lines 11 within each of the downcomers 4. To eliminate channeling and provide ready mixing of the centrally introduced steam, the device shown in the modification of Figure 2 is preferably employed. As shown in that figure, each branch line 11 terminates in an eductor 12, whereby the steam is diluted with flue gas or other seal gas in the downcomer 4. Because of the velocity of the stream of steam, the flue gas is drawn into the eductor 12 and thoroughly entrained and admixed with the steam so that all parts of the catalyst in the downcomer 4 are quite uniformly contacted with the steam. Above each of the eductors 12 there is shown a shield 13 to divert catalyst passing through each downcomer 4. Suitable means may be provided for anchoring or supporting the shields 13, as well as the eductors 12 and connecting lines 11 in the reactor.

In practical operation, steam may also be added to the charge stock as in the conventional hydrocarbon cracking processes.

The amount of steam to be employed in prehydration of the catalyst will depend upon the quantity of catalyst to be treated and the rate at which the catalyst is passed through the system, but there should be at least an amount of steam sufficient to substantially saturate the catalyst. For example, in a catalytic conversion apparatus employing a moving catalyst bed such as is illustrated in the accompanying drawing, and in a typical unit designed to circulate about 100 tons of catalyst per hour, to effect prehydration of the catalyst about 2000 to 6000 pounds of steam per hour may be introduced through the eductors as above explained. With the introduction of steam as described, the steam is in contact with the catalyst for only a short time before contacting the hydrocarbon vapors in the reactor. In a convertor of the size given in the example, steam will be in contact with the catalyst for about 1 to 2 minutes and not more than about five minutes at the maximum before contacting the hydrocarbon vapors.

Since the contact time of prehydration steam and catalyst is relatively short, larger amounts of steam than that required to saturate the catalyst may be used without adverse effect, since the excess steam thus added will function in substantially the same manner as processing steam added to the charge stock.

In the preferred embodiments shown in the drawings, the steam is introduced directly into the downcomers 4, thereby minimizing the time during which steam is permitted to remain in contact with the catalyst before the catalyst reaches the hydrocarbon vapors in the reactor. It is within the scope of the invention, however, to introduce the steam within the catalyst bed above the downcomers 4, provided such introduction of steam is below the point at which the inert seal gas is introduced through pipe 7 and at a lower pressure than the seal gas. The steam thus introduced would therefore be diluted by the downwardly flowing inert seal gas, and would not deactivate the catalyst during a like period of contact at the rate obtained with substantially all steam. As a general rule which may be practically followed, as the amount and corresponding partial pressure of the steam in the mixture of seal gas and steam is decreased, the time of contact of steam with the catalyst may be correspondingly increased.

As an example of an operation in accordance with the invention, a charge stock of Santa Maria Coker gas oil (22.2° API, 3.7% by weight S) was subjected to cracking over a commercial acid activated clay catalyst for about 125 cycles at a temperature of 800° F., atmospheric pressure, and a liquid space rate of 1.15, 15% by weight of process steam being added to the charge, and the catalyst subjected to steam prehydration for not more than 5 minutes per cycle. The run was repeated under substantially identical conditions except that the catalyst was not prehydrated. The run made with prehydration of the catalyst gave throughout the run higher average gasoline yields, consistently lower coke deposit, and consistently lower production of fixed gas.

Other comparative runs using the same kind of clay catalyst were made on the above sulfur-containing stock with and without prehydration of the catalyst, omitting the addition of process steam with the charge stock. At the end of the run, the catalyst was tested for activity in cracking a standard light East Texas gas oil. The catalyst that had been employed in cracking the sulfur stock without steam prehydration showed greater impairment in quality, yielding under the same test conditions larger quantities of coke and gas and lower ratios of gasoline/coke and gasoline/gas than the catalyst which was steam hydrated during the cracking run on the sulfur-containing stock.

Obviously many modifications and variations of the invention as hereinbefore set forth may be made without departing from the spirit and scope thereof and, therefore, only such limitations should be imposed as are indicated in the appended claims.

I claim as my invention:

1. In the cracking of petroleum stocks with acid activated sub-bentonite clay catalyst, the process which comprises continuously passing such clay catalyst downwardly through a reaction zone, contacting said catalyst with said petroleum stock in the reaction zone under catalytic cracking conditions and removing cracked products from said reaction zone, discharging used catalyst from said reaction zone, regenerating the discharged catalyst, returning regenerated catalyst to form a narrow vertical column of catalyst above said reaction zone, piling catalyst by gravity discharge from said column to accumulate the catalyst as a wide bed above the reaction zone, introducing an inert seal gas above said bed of catalyst and upwardly into said narrow vertical column of catalyst, a portion of the seal gas passing downwardly with the catalyst into said reaction zone thereby preventing flow of hydrocarbons into said bed; continuously discharging catalyst from said bed into said reaction zone to form a downwardly moving mass of catalyst in the reaction zone; and continuously introducing steam into contact with the moving catalyst at a lower pressure than the inert seal gas and below the point of introduction of the seal gas but prior to contact of the catalyst with said petroleum stock in the reaction zone.

2. In the cracking of petroleum stocks with acid activated sub-bentonite clay catalyst, the process which comprises continuously passing such clay catalyst downwardly through a reaction zone, contacting said catalyst with said petroleum stock in the reaction zone under catalytic cracking conditions and removing cracked products from said reaction zone, discharging used catalyst from said reaction zone, regenerating the discharged catalyst, returning regenerated catalyst to form a narrow vertical column of catalyst above said reaction zone, piling catalyst by gravity discharge from said column to accumulate the catalyst as a wide bed above the reaction zone, introducing an inert seal gas above said bed of catalyst and upwardly into said narrow vertical column of catalyst, a portion of the seal gas passing downwardly with the catalyst into said reaction zone; continuously withdrawing catalyst from said bed in a plurality of separated vertical columns and discharging such catalyst from said separated columns into said reaction zone to form a downwardly moving mass of catalyst in the reaction zone of continuous horizontal cross section, the said portion of the seal gas passing into said reaction zone entering therein through said separated columns of catalyst thereby preventing flow of hydrocarbons from said reaction zone into said columns; and introducing steam downwardly into said separated columns of catalyst at a rate at least sufficient to saturate the catalyst therewith prior to contact of the catalyst with said petroleum stock in said reaction zone.

3. In the operation of a cyclic process of hydrocarbon conversion, wherein catalyst is continuously passed through a conversion zone to contact hydrocarbon vapors in said zone, the carbonaceous deposit accumulated by the catalyst as a result of hydrocarbon conversion taking place in said zone being removed from the catalyst by burning to regenerate the catalyst, and regenerated catalyst then returned to said conversion zone for further contact with hydrocarbon vapors therein; the steps comprising collecting regenerated catalyst as a bed above said conversion zone, withdrawing the catalyst from said bed by gravity in a plurality of separate vertical moving columns of catalyst to effect uniform distribution of the catalyst to said conversion zone, flowing an inert gas downwardly into said moving columns of catalyst to prevent entry of hydrocarbon vapors from said conversion zone into said columns of catalyst, injecting steam at high velocity and in a restricted path at a point within said columns and out of contact with the catalyst therein at said point, entraining inert gas present in said columns by aspiration into admixture with said steam, and contacting the admixed steam and inert gas with catalyst in said columns below said point of steam injection.

4. The process in accordance with claim 2, wherein the catalyst employed is an acid-activated sub-bentonite clay, whereby the steam injected as defined raises the temperature of the catalyst as a result of exothermic heat of adsorption by the catalyst.

5. The process in accordance with claim 3, wherein said hydrocarbon vapors contain sulphur compounds as impurities therein and said catalyst comprises an acid activated sub-bentonite clay.

6. In a catalytic convertor for treatment of hydrocarbons, means for introducing hydrocarbons to be reacted in said convertor and means for discharging reacted hydrocarbons from said convertor; feeding means for continuously introducing catalyst into said convertor and discharge means located below said feeding means for continuously withdrawing catalyst from said convertor, whereby catalyst is caused to move by gravity through said convertor, catalyst distributing means within said convertor comprising a plurality of downcomers through which catalyst is moved by gravity and distributed to form a unitary bed within said convertor; means for introducing an inert seal gas into said convertor above said downcomers under positive pressure effecting downward flow of a portion of such inert gas into said downcomers, and steam injection means within said downcomers, said steam injection means comprising hooded eductors diverting catalyst flow within said downcomers and providing a gas admixing area therewithin for effecting admixture of the steam with inert gas within downcomers.

HUBERT A. SHABAKER.

REFERENCES CITED

The following references are of record in the file of this patent:

UNITED STATES PATENTS

| Number | Name | Date |
|---|---|---|
| 2,336,041 | Simpson et al. | Dec. 7, 1943 |
| 2,367,281 | Johnson | Jan. 16, 1945 |
| 2,432,344 | Sinclair | Dec. 9, 1947 |

OTHER REFERENCES

A Mechanism of Catalytic Cracking by R. C. Hansford, Ind. and Eng. Chem., vol. 39, No. 7, July 1947 (pages 849 to 852).

Unrefinable oils as Cracking Stock by Gustov Egloff et al., Oil and Gas Journal, April 23, 1941, page 30.

Cracking Sulfur Stocks with Natural Catalyst by Davidson, Petroleum Refiner, Sept. 1947 (vol. 26, No. 9), 10 pages.

Science of Petroleum by A. E. Dunstan et al., vol. II, page 861, Table IV.

"Comparison of Bead and Clay Catalyst" by L. P. Evans, Oil and Gas Journal, vol. 44, March 30, 1946, pages 167 to 183.